United States Patent
Wilfert et al.

[15] 3,635,517
[45] Jan. 18, 1972

[54] INSTALLATION FOR REDUCING THE SOILING OF REAR LIGHTS IN MOTOR VEHICLE BODIES

[72] Inventors: Karl Wilfert, Gerlingen-Waldstadt; Hans Gotz, Sindelfingen, both of Germany

[73] Assignee: Daimler-Benz Aktiengesellschaft, Stuttgart-Unterturkheim, Germany

[22] Filed: Aug. 21, 1969

[21] Appl. No.: 851,842

[30] Foreign Application Priority Data

Aug. 24, 1968 Germany.....................P 17 80 278.7

[52] U.S. Cl..............................296/28 R, 240/8.3, 296/1 S, 296/91
[51] Int. Cl............................................................B60q 1/00
[58] Field of Search ..........................296/1 S, 91, 28; 240/8.3

[56] References Cited

UNITED STATES PATENTS

| 1,923,349 | 8/1933 | Wolverton | 296/1 S |
| 2,827,560 | 3/1958 | Martin | 240/8.3 |

FOREIGN PATENTS OR APPLICATIONS

| 1,066,371 | 4/1967 | Great Britain | 296/1 S |
| 503,910 | 12/1954 | Italy | 296/1 S |
| 162,423 | 3/1958 | Sweden | 240/8.3 |

*Primary Examiner*—Leo Friaglia
*Assistant Examiner*—Leslie J. Paperner
*Attorney*—Craig, Antonelli & Hill

[57] ABSTRACT

An installation for reducing the soiling of the rear lights in motor vehicles in which the rear lights are mounted in body recesses in such a manner that air-guide channels are formed between the walls of the recesses and the walls of the rear lights facing the walls of the recesses.

17 Claims, 4 Drawing Figures

PATENTED JAN 18 1972    3,635,517

INVENTORS
KARL WILFERT
HANS GÖTZ

BY Craig, Antonelli, Stewart & Hill
ATTORNEYS

INSTALLATION FOR REDUCING THE SOILING OF REAR LIGHTS IN MOTOR VEHICLE BODIES

The present invention relates to an installation for the reduction of the soiling of rear lights at motor vehicle bodies, especially at bodies with a rear side extending essentially perpendicularly to the driving direction, which are provided with air-guide installations that terminate within the area of the rear lights and preferably start at such places of the body at which a dynamic or ram-air pressure occurs during the drive, as disclosed in German Pat. Application P 16 30 321.2.

In order to reduce the relatively strong soiling of rear lights of motor vehicles by the dust stirred up from the road surface or by other dirt particles thrown up or by insects, it is proposed in the aforementioned prior application to reduce the impairment of the lighting effect of the rear lights and therewith to increase the safety of the motor vehicle in that air-guide channels are provided which discharge within the area of the rear lights and preferably start at such places of the body, at which a dynamic air pressure occurs during the drive.

The present invention is concerned with the aim to enable the construction of an installation of the aforementioned type that is as simple as possible and at the same time to improve the effectiveness thereof. The present invention essentially consists in that the rear lights are arranged in lateral recesses or indentations of the rear body part and together with the recesses or indentations form air-guide channels which terminate or discharge, surrounding the rear lights at the rear end of the vehicle. Such types of air-guide channels can be manufactured by relatively slight structural expenditures whereas additionally the efficacy is increased because the lights are surrounded on all sides by an airflow.

In a structurally extraordinarily advantageous manner, the outer lateral wall of the rear light may be disposed approximately in the lateral plane of the rear body part and the air-guide channel may be delimited by the inner sidewall and the upper and lower walls of the rear light. This structurally very advantageous type of construction offers for the increase of the safety the still further advantage that the rear lights disposed in the lateral body plane can also render visible the vehicle from the side thereof.

In order to achieve as favorable as possible an air flow, it is advantageous if the inlet cross section of the air-guide channel formed by the outermost edge as viewed in the driving direction of the backwall of the rear light and by the recess or indentation corresponds to the outlet cross section surrounding the rear light on three sides. As a result thereof, a considerable aerodynamic or ram pressure flow is achieved which possesses at the channel inlet still about 60 to 70 percent of the aerodynamic or ram pressure of the respective vehicle velocity.

In order not to impair the flow, it is appropriate if the rear light is secured by way of one or several webs with swordlike cross section preferably at the bottom of the recess or indentation. Additionally, the rear wall of the rear light may have a shape that is favorable from an aerodynamic point of view.

A further reduction of the soiling danger of the rear lights is obtained if the cover pane of the rear light has a rib-shaped outer surface.

Accordingly, it is an object of the present invention to provide an installation for the reduction of soiling of rear lights in vehicle bodies which avoids by simple means the aforementioned shortcomings and drawbacks encountered in the prior art.

Another object of the present invention resides in an installation for reducing the soiling of rear lights in motor vehicles which not only permits a structurally simple type of design but also entails the possibility of increasing the efficacy thereof.

A further object of the present invention resides in an installation of the type described above which can be manufactured with relatively slight expenditures while simultaneously increasing the efficiency thereof.

Still another object of the present invention resides in an installation for reducing the soiling of rear lights in vehicles which minimizes disturbances in the airflow.

These and further objects, features and advantages of the present invention will become more obvious from the following description when taken in connection with the accompanying drawing which shows, for purposes of illustration only, one embodiment in accordance with the present invention, and wherein.

Figure 1:
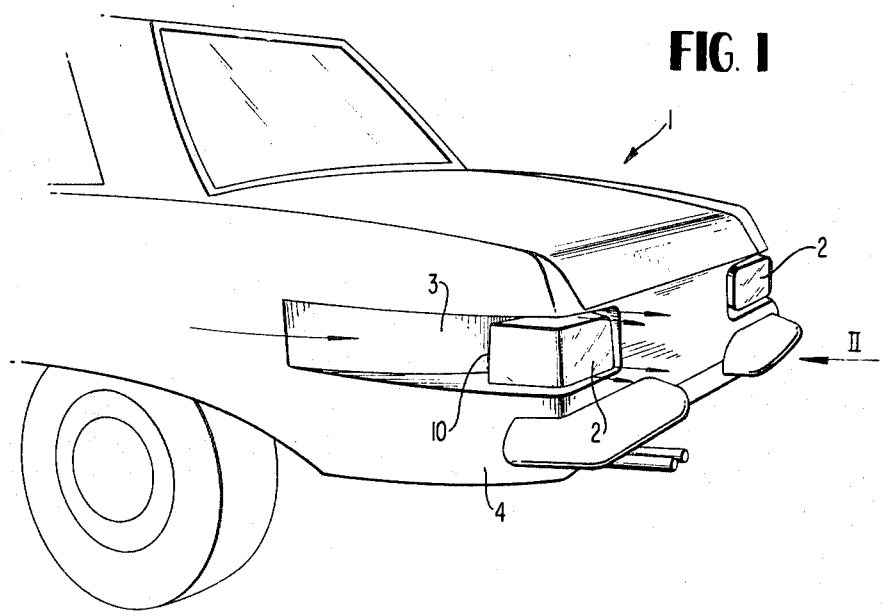
FIG. 1 is a perspective view of the rear section of a passenger motor vehicle equipped with an installation for the reduction of the soiling of the rear lights in accordance with the present invention.
Figure 2:
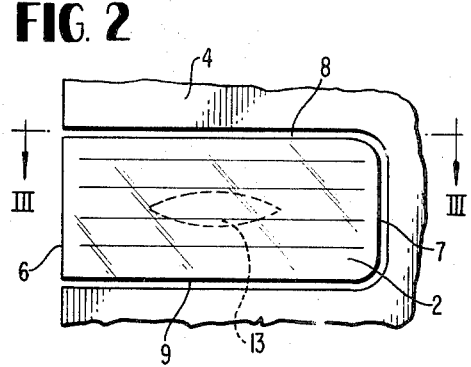
FIG. 2 is a partial elevational view, on an enlarged scale, taken in the direction of arrow II of FIG. 1.
Figure 3:
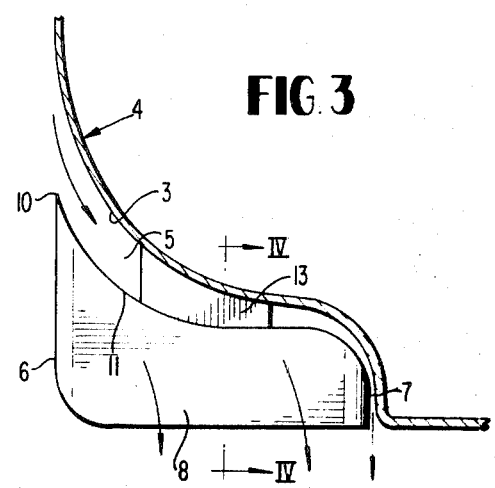
FIG. 3 is a cross-sectional view taken along line III—III of FIG. 2.
Figure 4:
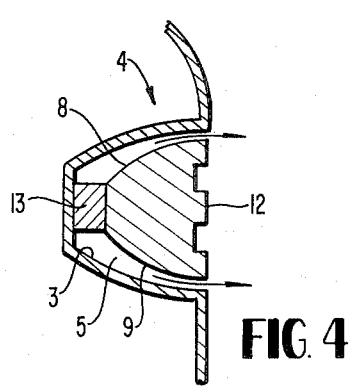
FIG. 4 is a cross-sectional view taken along line IV—IV of FIG. 3.

Referring now to the drawing wherein like reference numerals are used throughout the various views to designate like parts and more particularly to FIG. 1, the rear section of the motor vehicle generally designated by reference numeral 1 which is illustrated in this figure, is provided with so-called multichamber lights 2 in which the rear lights, brake lights, turn indicator and possibly backup lights are combined into a respective rear light 2. These rear lights 2 are arranged in recesses or indentations 3 of the rear body part, in the illustrated embodiment of the rear fender 4, and together with this recess 3, form an air-guide channel 5 that begins within the area of the sidewall of the body in which an aerodynamic air pressure or ram pressure occurs during the drive. The rear light 2 is so arranged in the recess or indentations 3 that its outer lateral wall 6 is disposed in the lateral plane of the body and in that the inner sidewall 7 and the upper and lower walls 8 and 9 of the rear lights 2 delimit the air-guide channel 5 and together with the same form the outlet cross section of the air-guide channel 5. The outermost edge 10 of the rear wall 11 of the rear light 2 is drawn back so far that the inlet cross section of the air-guide channel 5 formed by the same and by the recess 3 corresponds to the entire outlet cross section surrounding the light (see FIGS. 1 and 2). With this arrangement, an airstream flows about the rear lights 2 on all sides thereof so that the stirred up dust or other dirt particles cannot deposit themselves on the rear lights 2. As a result thereof, a soiling of the rear light 2 is avoided far-reachingly.

The soiling of the cover pane 12 of the rear lights 2 is additionally still further limited in that the cover pane 12 is provided with a rib-shaped outer surface.

In order to assure as favorable as possible a flow condition in the air-guide channel 5, the rear light 2 is secured on the bottom of the recess or indentation 3 by means of a web 13 that has an approximately sword-shaped cross section. Additionally, the rear wall 11 of the rear light 2 is curved favorably from an aerodynamic point of view.

As a result of the arrangement of the rear lights 2 in recesses or indentations 3 that become larger from in front toward the rear, air-guide channels 5 are formed in which due to the configuration of the inlet and outlet cross sections a considerable aerodynamic pressure flow or ram pressure flow results which has at the channel inlet still 60 to 70 percent of the aerodynamic pressure of the corresponding vehicle velocity.

While we have shown and described only one embodiment in accordance with the present invention, it is understood that the same is not limited thereto but is susceptible of numerous changes and modifications as known to those skilled in the art; for example, the configuration of the rear lights may be varied, and we therefore do not wish to be limited to the details shown and described herein but intend to cover all such changes and modifications as are known to those skilled in the art.

We claim:

1. An installation for reducing the soiling of rear lights in motor vehicle bodies of the type having a rear face extending substantially perpendicularly to the vehicle driving direction, which bodies are equipped with air-guide means for discharging air within the area of the rear lights and beginning at an inlet on the body at a place where an aerodynamic pressure occurs during the drive, characterized in that the rear lights are arranged in lateral recess means of a rear body part, said lateral recess means being open at both the rear face and at a side face extending substantially perpendicularly to said rear face, said inlet being formed in the lateral recess means at the side face thereof, and the external walls of said rear lights together with the recess means form air-guide channel means surrounding the rear lights for discharging air at the rear face.

2. An installation according to claim 1, characterized in that the outer lateral wall of a respective rear light is disposed approximately in the lateral plane of the rear body part in alignment with said side face and in that a respective air-guide channel means is delimited by the inner lateral wall and the upper and lower walls of the rear light.

3. An installation according to claim 1, characterized in that a respective rear light is secured to the body by way of web means having a cross section with convex upper and lower surfaces.

4. An installation according to claim 1, characterized by a cover pane means for a respective rear light which has a rib-shaped outer surface.

5. An installation according to claim 1, characterized in that a respective rear light is secured to the body by way of web means.

6. An installation according to claim 5, characterized in that the rear light is secured by way of said web means to the inside of the recess means.

7. An installation according to claim 5, characterized in that several web means are provided for securing a respective rear light.

8. An installation for reducing the soiling of rear lights in motor vehicle bodies of the type having a rear face extending substantially perpendicularly to the vehicle driving direction, said bodies being equipped with air-guide means for discharging air within the area of the rear lights, said air-guide means beginning at an inlet on the body at a place where an aerodynamic pressure occurs during the drive, said rear lights being arranged in lateral recess means of a rear body part, the external walls of said rear lights together with the recess means forming air-guide channel means surrounding the rear lights for discharging air at the rear face, characterized in that the inlet cross section of the air-guide channel means formed by the edge of the rear wall of the rear light disposed outermost in the driving direction and by the recess means corresponds approximately to the outlet cross section surrounding the rear light on three sides thereof.

9. An installation according to claim 8, characterized in that the respective rear wall of a rear light has an aerodynamically curved shape.

10. An installation for reducing the soiling of rear lights in motor vehicle bodies of the type having a rear face extending substantially perpendicularly to the vehicle driving direction, said bodies being equipped with air-guide means for discharging air within the area of the rear lights, said air-guide means beginning at an inlet on the body at a place where an aerodynamic pressure occurs during the drive, said rear lights being arranged in lateral recess means of a rear body part, the external walls of said rear lights together with the recess means forming air-guide channel means surrounding the rear lights for discharging air at the rear face, the outer lateral of a respective rear light being disposed approximately in the lateral plane of the rear body part, said respective air-guide channel means being delimited by an inner lateral wall and upper and lower walls of the rear light, characterized in that the inlet cross section of the air-guide channel means formed by the edge of the rear wall of the rear light disposed outermost in the driving direction and by the recess means corresponds approximately to the outlet cross section surrounding the rear light on three sides thereof.

11. An installation according to claim 10, characterized in that a respective rear light is secured to the body by way of web means.

12. An installation according to claim 11, characterized in that the web means has a cross section with convex upper and lower surfaces.

13. An installation according to claim 12, characterized in that the rear light is secured by way of said web means to the inside of the recess means.

14. An installation according to claim 13, characterized in that several web means are provided for securing a respective rear light.

15. An installation according to claim 13, characterized in that the respective rear wall of a rear light has an aerodynamically curved shape.

16. An installation according to claim 15, characterized by a cover pane means for a respective rear light which has a rib-shaped outer surface.

17. An installation for reducing the soiling of rear lights in motor vehicle bodies of the type having a rear face extending substantially perpendicularly to the vehicle driving direction, said bodies being equipped with air-guide means for discharging air within the area of the rear lights, said air-guide means beginning at an inlet on the body at a place where an aerodynamic pressure occurs during the drive, said rear lights being arranged in lateral recess means of a rear body part, the external walls of said rear lights together with the recess means forming air-guide channel means surrounding the rear lights for discharging air at the rear face, characterized in that the rear wall of a rear light has an approximately S-shaped configuration as seen in plan view and a cross section tapering toward the front.

* * * * *